(12) United States Patent
Murray

(10) Patent No.: US 8,373,328 B2
(45) Date of Patent: Feb. 12, 2013

(54) PULSED MULTI-ROTOR CONSTANT AIR GAP SWITCHED RELUCTANCE MOTOR

(75) Inventor: James F. Murray, Bethany, OK (US)

(73) Assignee: Convergent Power, Inc., Los Angeles, CA (US)

( * ) Notice: Subject to any disclaimer, the term of this patent is extended or adjusted under 35 U.S.C. 154(b) by 86 days.

(21) Appl. No.: 12/993,941

(22) PCT Filed: Jun. 4, 2009

(86) PCT No.: PCT/US2009/046246
§ 371 (c)(1),
(2), (4) Date: Dec. 3, 2010

(87) PCT Pub. No.: WO2009/149251
PCT Pub. Date: Dec. 10, 2009

(65) Prior Publication Data
US 2011/0074232 A1    Mar. 31, 2011

Related U.S. Application Data

(60) Provisional application No. 61/058,824, filed on Jun. 4, 2008.

(51) Int. Cl.
*H02K 1/22* (2006.01)
(52) U.S. Cl. ...................... 310/261.1; 310/112
(58) Field of Classification Search ............... 310/261.1, 310/112, 114, 118, 68 B
See application file for complete search history.

(56) References Cited

U.S. PATENT DOCUMENTS

| | | |
|---|---|---|
| 120,057 A | 10/1871 | Gramme |
| 218,520 A | 8/1879 | Gramme |
| 219,393 A | 9/1879 | Edison |
| 256,182 A | 4/1882 | Wheeler |
| 269,036 A | 12/1882 | Fisher |
| 269,281 A | 12/1882 | Gramme |
| 295,552 A | 3/1884 | Hochhausen |
| 323,976 A | 8/1885 | Thomson |
| 331,815 A | 12/1885 | Orton |
| 339,079 A | 3/1886 | Thomson |
| 357,115 A | 2/1887 | Buckingham |
| 369,754 A | 9/1887 | Thomson |
| 373,145 A | 11/1887 | Main |

(Continued)

FOREIGN PATENT DOCUMENTS

| | | |
|---|---|---|
| CA | 1030600 | 5/1978 |
| EP | 0151199 A1 | 8/1985 |

(Continued)

OTHER PUBLICATIONS

International Search Report for PCT/EP2000/001314 dated Jul. 13, 2000.

*Primary Examiner* — Nguyen N Hanh
(74) *Attorney, Agent, or Firm* — Parsons Behle & Latimer

(57) ABSTRACT

An electric motor with two or more stator sections, each possessing at least two salient pole projections having power windings, and two or more armature sections on a common shaft. The armature sections are at an angle to each other: e.g. 90 degrees for two armatures, 120 degrees for three armatures. Each armature has a lamination stack or ferrite core. The armature sections form a constant air gap with the field poles, and have an elliptical profile with respect to the output shaft. The armature sections have no electrical windings, or conductors and require no slip rings, rotor coils or permanent magnets. The power windings are energized by pulses of electric current. Said pulses are automatically supplied to the salient pole nearest the longest rotor flux path available, as determined by a shaft position sensor.

20 Claims, 4 Drawing Sheets

U.S. PATENT DOCUMENTS

| | | | |
|---|---|---|---|
| 392,765 A | 11/1888 | Thomson | |
| 397,550 A | 2/1889 | Hunter | |
| 405,602 A | 6/1889 | Rosenqvist | |
| 406,494 A | 7/1889 | Wood | |
| 648,529 A | 5/1900 | Roinson | |
| 849,713 A | 4/1907 | Alexanderson | |
| 1,334,831 A | 3/1920 | Bergman | |
| 1,961,416 A | 6/1934 | De Luca | |
| 2,634,627 A | 4/1953 | Flynn | |
| 2,688,886 A | 9/1954 | Flynn | |
| 3,202,963 A | 8/1965 | Flynn | |
| 3,354,333 A | 11/1967 | Henry-Baudot | |
| 3,539,854 A | 11/1970 | Futterer | |
| 3,799,462 A | 3/1974 | Fahrbach | |
| 4,556,809 A * | 12/1985 | Beisse et al. | 310/114 |
| 4,595,975 A | 6/1986 | Gray, Sr. | |
| 4,659,953 A * | 4/1987 | Luneau | 310/111 |
| 4,661,747 A | 4/1987 | Gray, Sr. | |
| 4,661,756 A * | 4/1987 | Murphy et al. | 318/701 |
| 4,780,632 A * | 10/1988 | Murray, III | 310/111 |
| 4,962,331 A * | 10/1990 | Smith | 310/216.001 |
| 5,175,462 A | 12/1992 | Yoshino et al. | |
| 5,274,907 A | 1/1994 | Moorehead | |
| 5,331,729 A | 7/1994 | Moorehead | |
| 5,886,450 A | 3/1999 | Kuehnle | |
| 6,392,370 B1 | 5/2002 | Bedini | |
| 6,504,272 B2 | 1/2003 | Sakamoto | |
| 6,545,444 B2 | 4/2003 | Bedini | |
| 6,765,321 B2 | 7/2004 | Sakamoto | |
| 7,036,207 B2 | 5/2006 | Neal | |
| 7,242,118 B2 | 7/2007 | Sakamoto | |
| 2002/0113511 A1 * | 8/2002 | Daikoku et al. | 310/112 |
| 2003/0117111 A1 | 6/2003 | Bedini | |
| 2005/0189927 A1 | 9/2005 | Myers | |
| 2009/0108698 A1 | 4/2009 | Guan et al. | |

FOREIGN PATENT DOCUMENTS

| | | |
|---|---|---|
| WO | WO8502728 | 6/1985 |
| WO | WO0054295 | 9/2000 |

* cited by examiner 3A 3B

US 8,373,328 B2

PULSED MULTI-ROTOR CONSTANT AIR GAP SWITCHED RELUCTANCE MOTOR

CROSS-REFERENCE TO RELATED APPLICATIONS

This PCT application claims the benefit under 35 U.S.C. §119(e) of Provisional Application Ser. No. 61/058,824, filed on Jun. 4, 2008, entitled Pulsed Multi-Rotor Constant Air Gap Induction Motor; the entire disclosure of which is incorporated by reference herein.

FIELD OF THE INVENTION

This invention relates to the field of direct energy conversion and the production of mechanical torque from the utilization of an electric current. More particularly, to the field of electric motors and to utilization of direct current as a "motive force." The invention relates to a class of motor having multiple stator and rotor sections, such that each rotor section is associated with a specific stator section, although attached to a single out put shaft. The lateral axis of each rotor section is disposed at an oblique angle with respect to the axis of the common shaft, and angularly displaced in accordance with the number of rotor sections employed, for example: 90 mechanical degrees for two rotors, 120 degrees for three rotors, etc.

BACKGROUND OF THE INVENTION

Notwithstanding the increased interest in energy conversion over the last decade, no substantial advance has been made in increasing the conversion efficiency of electric motors. Rather, the art has made incremental advances relating to improved magnetic materials, more powerful permanent magnets, and sophisticated electronic switching devices. Such improvements, at best, relate to very small increases in overall efficiency, usually gained at very considerable expense.

Patents in this area include: U.S. Pat. Nos. 2,917,699; 3,132,269; 3,321,652; 3,956,649; 3,571,639; 3,398,386; 3,760,205; 4, 639,626 and 4,659,953. Also in this area are EPO patent no. 0174290 (March 1986); German patent no. 1538242 (October 1969); French patent no. 2386181 (October 1978) and UK patent no. 1263176 (February 1972).

U.S. Pat. No. 4,780,632, entitled "Alternator Having Improved Efficiency," issued to the applicant on Oct. 25, 1988, describes an alternator having a single rotor canted at an angle.

The basic concept employed in earlier motor art is the interaction between a current carrying conductor (s) and a magnetic field of some kind. This fact is true regardless of motor type. This basic concept appears in DC motors, single phase AC motors, Poly Phase Induction Slip motors, which utilize a rotating magnetic field, and in Polyphase Synchronous Motors with externally excited electromagnetic cores, or permanent magnet cores as the case may be.

The only exceptions to this rule may be found in the design of stepper motors, which utilize a magnetic "ratcheting" action upon magnetic material in the armature, in response to applied pulses of current, and various types of reluctance motors in which the rotor moves with respect to a salient pole piece, experiencing a large variation in air gap during its motion.

The prior art has not produced a multiple phase, multiply segmented stator with individual, obliquely disposed, laminated armatures devoted to each stator section, such that each stator/rotor combination employs a continuous air gap of constant dimension, regardless of the elliptical profile of said armatures, but not employing any current carrying conductors, coils, windings or bars within or upon the armatures, as a means of producing torque upon the output shaft.

SUMMARY OF THE INVENTION

An electric motor is disclosed, having a plurality of motor segments, each segment having a stator, having stator poles and stator windings and a rotor having a flux path element. The flux path elements are attached to a rotor shaft at an oblique angle to the longitudinal axis of the shaft. The flux path elements have a shape that provides a uniform air gap between them and the stator poles when the shaft is rotated. The rotor shafts of said motor segments are mechanically coupled to each other.

In an embodiment, the flux path elements comprise a silicon steel lamination stack or a solid ferrite plate. In a further embodiment, the motor has a shaft angle sensor and a motor controller, and the motor controller receives a shaft angle from the sensor and supplies current pulses to the stator windings according to the shaft's angular position signal.

In a further embodiment, the stator poles are positioned in pole pairs with the rotor and rotor shaft between them and form isolated stator magnetic field circuits when the stator windings are supplied with electrical current, such that a magnetic field is established having a single magnetic polarity in each of the poles of said pole pairs, with each pole of the pole pairs having opposite magnetic polarity. In further embodiments more than two poles are installed in each stator section.

In a further embodiment, the rotor flux plate elements have a shape defined by the volume contained between two parallel cuts taken through a right circular cylinder at an angle other than 90 degrees with respect to the axis of symmetry of said cylinder, each flux plate element having front and back faces that are substantially elliptical, and having major axes. In an embodiment, the flux element angle with respect to the axis of symmetry is substantially 45 degrees. In an embodiment, the rotors are attached to a common shaft and the rotor flux path elements are arranged on said common shaft such that the major axes of the flux path elements are equally spaced on the shaft and wherein the stator poles are in the same position with respect to the common shaft for each motor segment. In an exemplary embodiment, of this arrangement, the motor has two motor segments and two rotor flux path elements and the rotor flux path elements are arranged on the common shaft such that their major axes are spaced 90 degrees apart.

In a further embodiment, the motor has rotor counter-weights to statically and dynamically balance the mass of the rotor flux elements.

In a further embodiment, the motor has starter windings adapted to start the motor in a desired rotational direction.

In a further embodiment, current generated in the windings from collapsing magnetic fields is captured and used.

DETAILED DESCRIPTION

Figure 1:
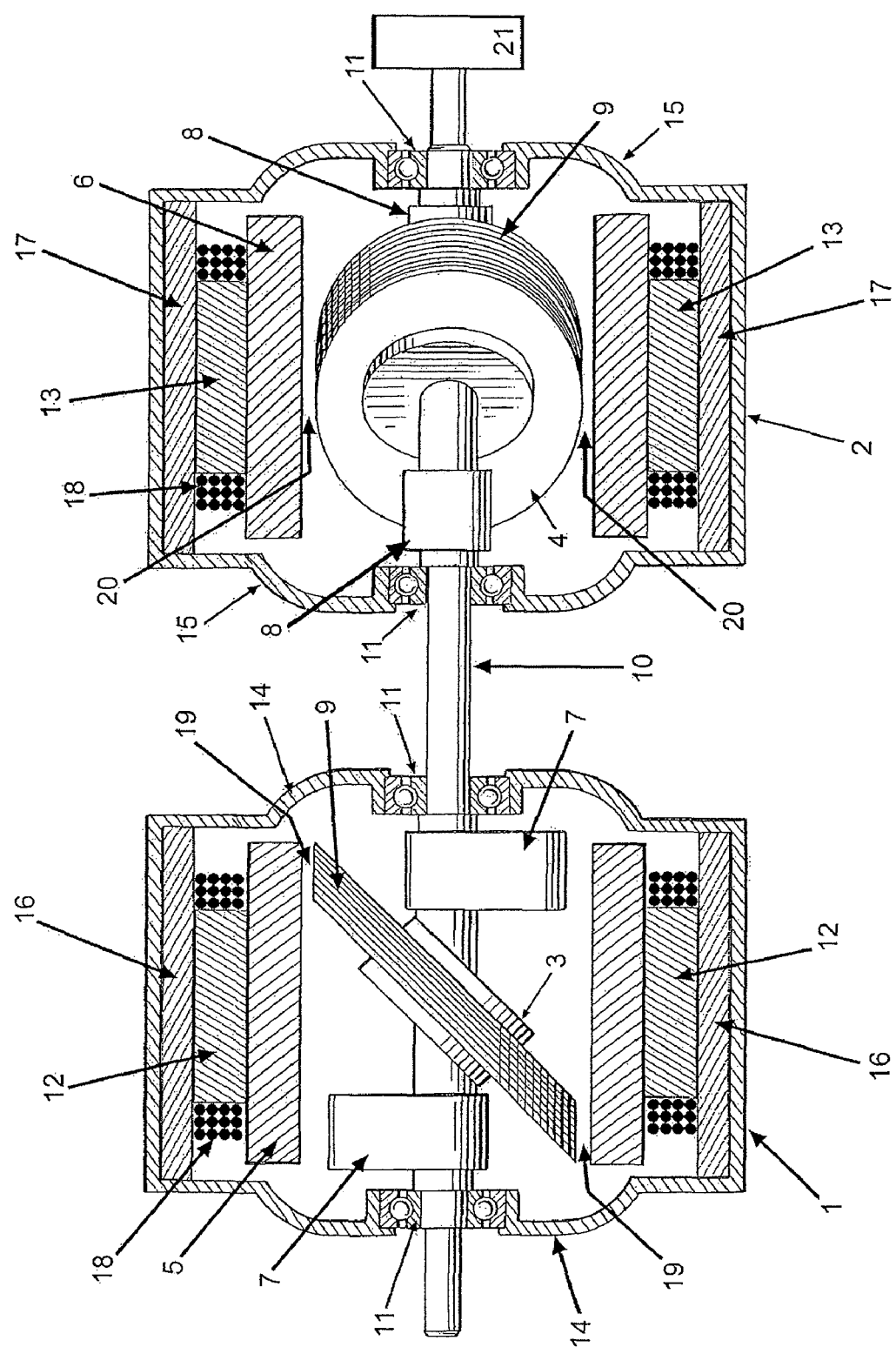
FIG. 1 is an overall view of a preferred embodiment of the invention, showing stator sections in cut-away views revealing the disposition of bearings, common output shaft, rotor assemblies, counter weights, stator power windings and stator laminations.

FIGS. 1-4 illustrate a preferred embodiment of the motor, which constitutes the invention disclosed herein. Reviewing FIG. 1, it will be seen, that the motor consists of a double stator housing (1, 2) physically separated, but functionally joined together by means of a continuous shaft (10), upon which are mounted two armatures (3, 4), one within each stator assembly. Said shaft is carried by bearing sets (11), located within end-bells (14, 15).

Rotor assemblies (3, 4) each consist of a stack of silicon steel laminations (9), a molded ferrite core, or any other high permeability magnetic material designed to suppress eddy currents, and machined so as to produce a section of a right circular cylinder canted at an angle of 45 degrees with respect to the motor shaft (10). When viewed face on, the rotor structure appears to be elliptical in shape. However, the side view depicts a rhomboid tilted at 45 degrees. This angle may not be the most optimal angle, and it should be realized that other angles may be employed without departure from the spirit of the invention.

The common shaft (10) may also carry counter weights (7, 8), as depicted, which function to ensure a smooth rotary motion by suppressing mechanical vibrations produced by the uneven mass distribution of the elliptical armature sections (3,4).

Each stator assembly contains an individual stack of stator laminations (16, 17) or a magnetic ferrite cylinder, from which extend two or more salient pole projections (12,13), each of which is wound with a power coil (18). The face of each pole projection is extended to the right and the left of center to ensure continuous air gaps of constant dimension (19, 20), which are always aligned parallel to the rotor's edge contour regardless of its angular disposition. Those familiar with the art will realize that it may be possible to install more than two pole projections per armature without departing from the spirit of this invention.

The pole projections in each stator section are parallel to each other, but the rotor sections are displaced upon the shaft by a predetermined mechanical angle: 90 degrees for two pole sets 120 degrees for three pole sets, etc.

The motor shaft extends several inches beyond the end bell housings (14, 15) on each side of the motor. One end of the shaft is utilized as a take off point for mechanical power, or load, while the other side of shaft carries a shaft position indicator (21), which is just an angular transducer, and may consist of a simple rotary encoder, or a more complex device containing discrete optical sensors and slotted disks.

The stator power windings may be connected in series or in parallel as preferred. Said windings receive their drive pulses from switching transistors, MOSFETs, or other solid state switching devices within the controller (22), which in turn receive their firing instructions directly, or indirectly, from the shaft position sensor (21).

Power resistor (23) is used as a sump to harmlessly dissipate any remaining energy associated with the collapsing magnetic fields within the stator as the motor rotates.

A Description of The Rotor Geometry

Figure 2:
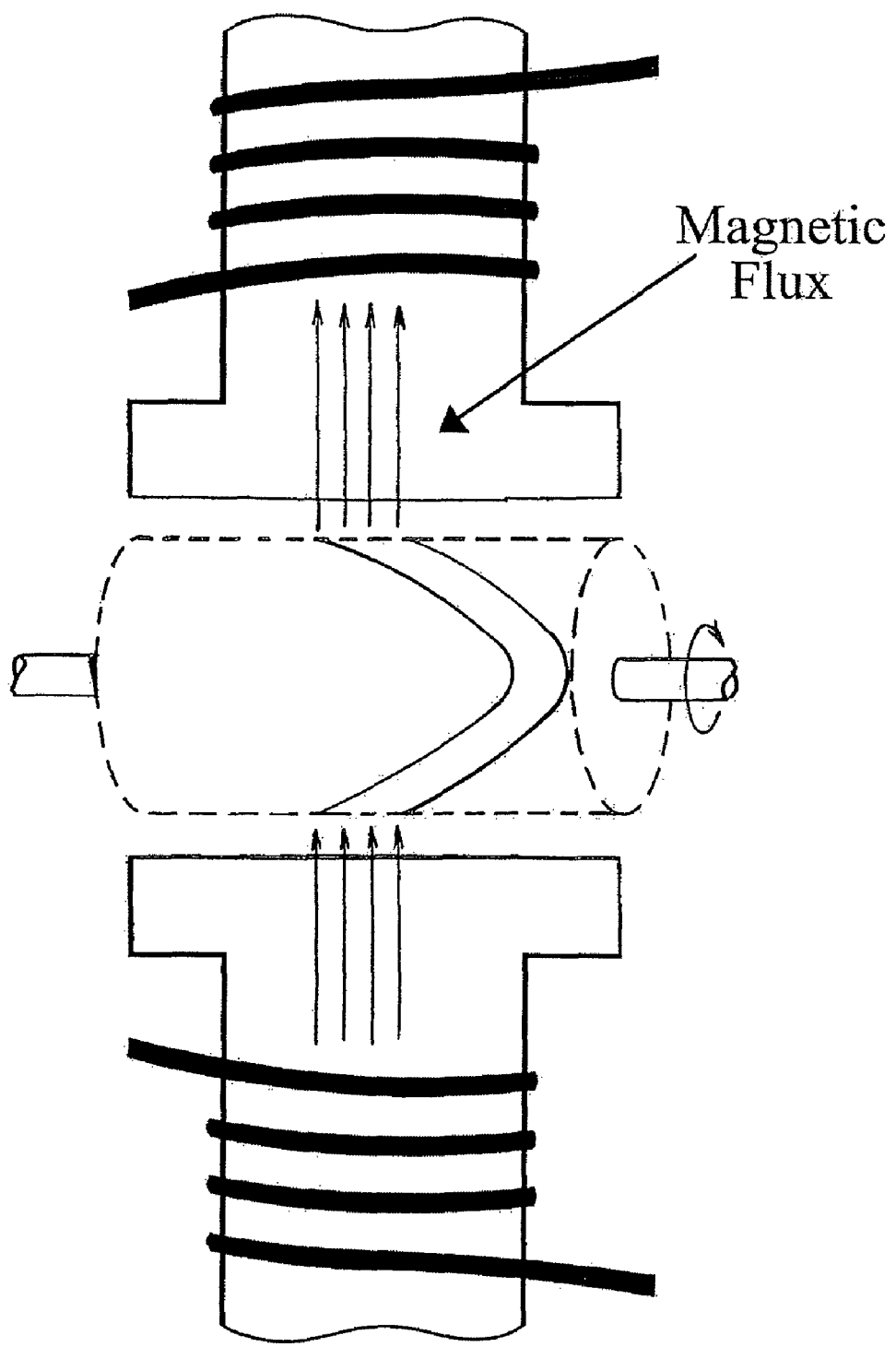
FIG. 2 is a schematic diagram of an individual rotor/stator section, depicting the relationships between such components as rotor geometry, magnetic flux, air gaps, salient poles and power windings.

Drawing attention now, to FIG. 2, it will be noted, that a cylindrical outline is depicted between the poles of an electromagnet, through which the lines of flux are directed in a upward fashion. Notice also, the solid, elliptical lines shown. These demonstrate the shape of the lamination stack or ferrite core required by this invention. Said shape is the result of making two parallel slices through a right circular cylinder at an angle of 45 degrees, and then removing all of the cylindrical body except the elliptical core, as demonstrated.

Figure 3:
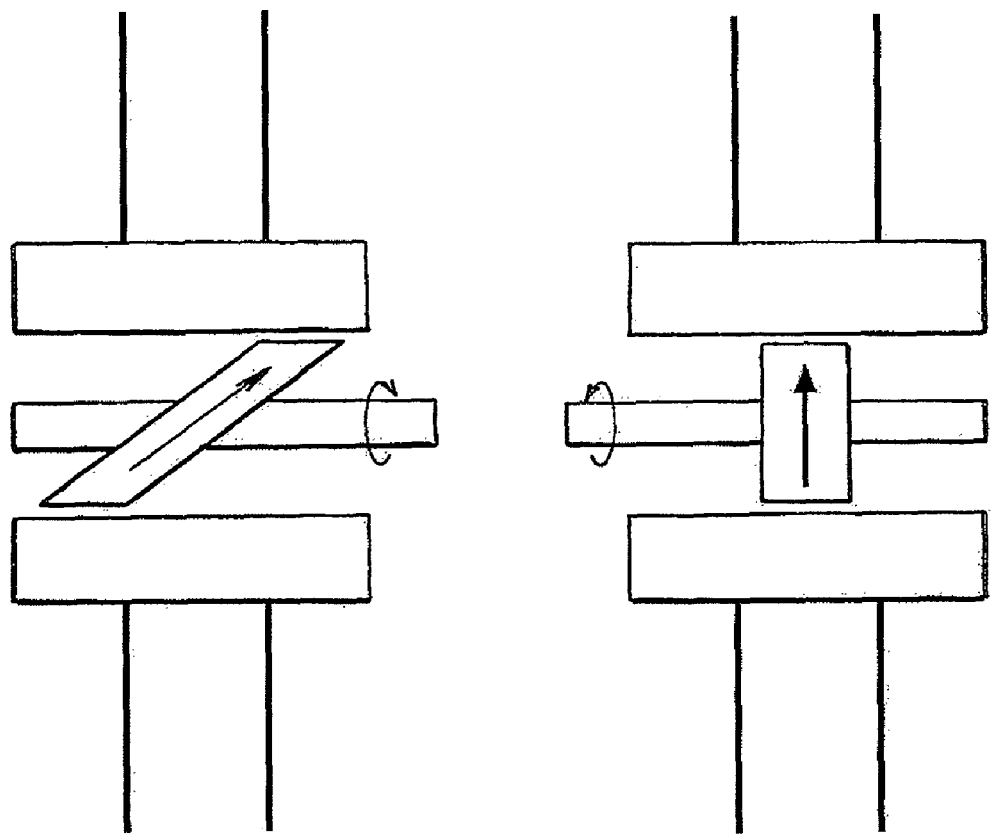
FIG. 3 is a schematic diagram showing maximum and minimum rotor cross-sections relative to air gaps, stator poles and magnetic circuits.

Magnetically, this elliptical rotor will have some very interesting properties. FIG. 3 illustrates a schematic cross-sectional view of the flux path of the rotor in two mechanical positions, each 90 degrees apart. Note, in FIG. 3A, that the elliptical cross-section presents a longer path to the magnetic flux than does the cross-section illustrated in FIG. 3B. Note as well that these figures represent approximate flux paths and not actual cross sectional views of the rotor.

Accordingly, the elastic nature of the lines of flux will tend to exert a torque upon the rotor geometry, forcing the assembly to rotate 90 degrees, whereby the shortest path is available for the magnetic lines to complete their circuit as is evident in 3B.

This process does not require the presence of a "secondary" magnetic coil, the addition of which would tend to decrease a motor's overall inductance, by means of quadrature coupling, or armature reaction, during normal operation.

Detailed Description of the Motor's Operation

One embodiment of this invention employs two rotors, each fabricated from a stack of laminated disks, pressed upon arbors which are obliquely disposed with respect to the intended axis of rotation, and then integrally machined in order to provide both rotors with peripheral contours equivalent to that of a cylinder while retaining their overall elliptical shape. Each stator section is formed by a lamination stack having two, spaced-apart, salient pole projections terminating in concave pole faces whose radii are slightly larger than the radius of each rotor. Both rotors thereby define air gaps of constant dimension while rotating. Each rotor is in magnetic series with two air gaps and two pole pieces and a complete magnetic circuit which contains its own coils for the production of magnetic flux. Each magnetic rotor circuit is separate and distinct from each other magnetic rotor circuit, although they share a common output shaft. An angular position sensor or shaft encoder is positioned at one end of the output shaft, and sends electronic position signals to a DC power supply/controller, which in turn sends pulses to the motor stator sections as required.

The application of a current pulse to a given set of stator coils, causes the rapid rise of magnetic flux within the selected stator section and its associated rotor. The increased flux density then causes the rotation of the active rotor, as the flux lines "shrink" to ensure their manifestation in a circuit of minimum length. The output torque is produced by the laws of magnetic reluctance acting in conjunction with the innovative geometry of the rotor. No current carrying conductors are involved in the rotor.

As the first rotor reaches its position of minimum cross-sectional diameter, the shaft encoder then directs the electronic controller to send a power pulse to the second rotor, and the operation repeats itself. When this procedure is enacted every 90 degrees, the result is a smooth angular rotation, and the production of a continuous average torque. However, a secondary result of this arrangement is the production of an electrical output from each stator section as a result of the collapsing of it's magnetic field at the end of each power cycle. This electrical energy may be harmlessly dissipated in a sump resistor, or it may be put to use, for example in powering other devices, including lamps or heaters or recovered to supply a portion of the energy used to drive the motor.

In an embodiment, an exemplary motor utilizes a rotor geometry consisting of a lamination stack or a molded ferrite shape, canted at a specific angle with respect to the output shaft, while retaining a circular cross section to the axis of rotation, and presenting an overall elliptical appearance in its own plane. This arrangement allows for a constant air gap to be maintained between the rotor's edge and the pole pieces thereby producing mechanical torque without the utilization of coils or conductors residing anywhere upon said rotor.

An exemplary motor employs a plurality of "elliptical" rotors mounted upon the same output shaft, but positioned such that each rotor section is advanced a certain number of mechanical degrees from the others such that torque production over 360 degrees of rotation is shared equally by the number of rotors utilized. The motor also has a plurality of pole sets and separate magnetic circuits, such that each elliptical rotor section is associated with its own external source of magnetic flux, regardless of the fact that they share a common output shaft. Accordingly, the salient stator pole projections will all reside in the same plane and be parallel to each other, while the rotor sections will be displaced upon the output shaft by predetermined mechanical angles; 90 degrees for two pole sets, 120 degrees for three pole sets, etc. Those skilled in the art will realize that this arrangement may be reversed without departing from the spirit of the invention.

Referring now to FIGS. 1 and 3, which each depict the relationship of the rotors to the stators, it will be noted, that the left hand rotor is positioned between the salient poles of its stator such that it's oblique length presents the longest possible path to the magnetic flux produced by the associated pole set. The right hand rotor on the same shaft, will simultaneously present it's shortest cross sectional path to its associated pole projections.

Sensing this arrangement, the shaft position sensor (21) will cause the controller (22) to energize starting windings (not shown) which will rotate the motor shaft in the desired direction, while simultaneously sending a current pulse into the left hand pole set depicted in FIG. 1. Those skilled in the art will understand and appreciate how starter windings are implemented to start a motor in the desired rotational direction.

The appearance of lines of force within the first rotor segment will cause a twisting action upon that rotor's lamination stack, such that torque is produced upon the motor output shaft in the desired direction. At the same time, the right hand rotor is rotated, by the turning shaft, into a position of readiness with respect to the right hand magnetic pole set.

Figure 4:
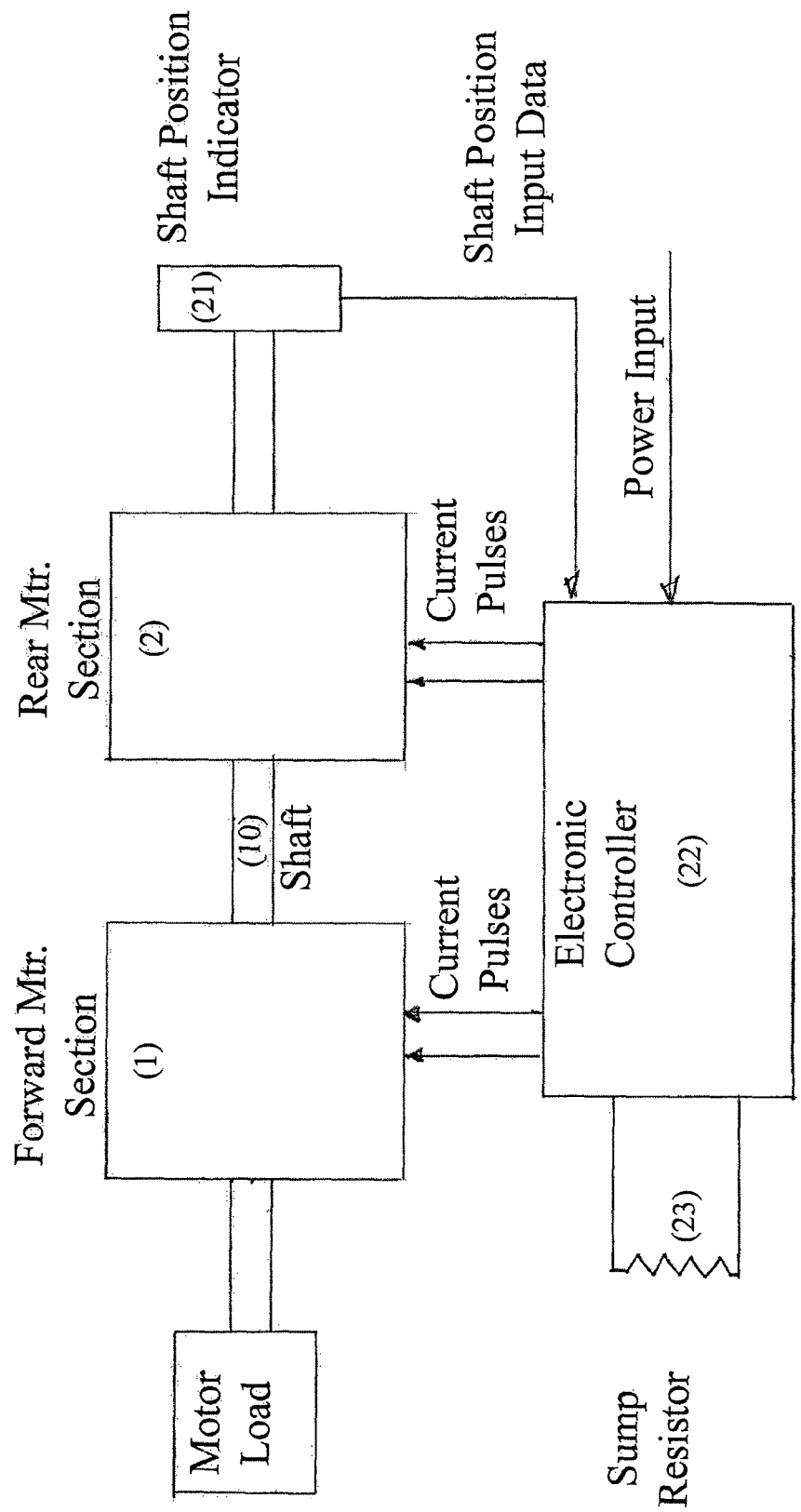
FIG. 4 is a block diagram of an exemplary motor system, depicting forward and rear motor sections, the motor load, the shaft position sensor, the electronic controller and the sump resistor.

The shaft position sensor (21), illustrated in FIG. 4, then signals the controller (22), which directs a current pulse into the second stator pole set, advancing the output shaft by another 90 degrees. Utilizing this means, each motor half is alternately energized and a complete revolution of the shaft is achieved with every four electrical pulses. Thus a 900 RPM motor will require: 4 Pulses/Rev×900 Rev/Min.=3600 Pulses/Min supplied from the controller's power supply.

The average torque available on the motor output shaft will be a function of the cooperative effort developed by both rotors over each mechanical revolution.

The output torque developed by this method is strictly a reluctance torque, generated as the lines of magnetic flux within each rotor section alternately shrink in an attempt to provide themselves with the shortest possible magnetic path between poles.

It is most important to realize that this torque-producing mechanism does not involve any interaction of either stator's magnetic field with a current carrying conductor of any kind, neither in the form of a speed voltage interaction, nor in the form of a transformer coupling with a time-varying field. Instead, the torque appearing on the motor shaft is a direct function of the rotor's geometry interacting with forces produced at the boundaries between the rotor body and the stator poles, and by internal cam action particular to the rotor geometry in the presence of a contracting flux.

Magnetic energy stored in the stretched lines of flux between each pole set must be dissipated as each field structure collapses in response to instructions from the controller. This will ensure that an "empty" inductor will be available at the start of each 90 degree cycle. Accordingly, fly-back diodes are provided in association with each power winding. The diodes direct pulses generated by said collapsing fields into a sump or load resistor (23), where they are harmlessly dissipated as excess heat. Alternatively, said energy may be used to power other electrical appliances external to the motor.

Efficiency and Scaling

Because this type of reluctance motor carries no rotor windings, at least 50% of the I squared R losses, stray copper losses and hysteresis losses experienced by traditional motor technology will be avoided in accordance with the spirit of invention.

Energy savings of this magnitude are possible primarily because of the constant air gap afforded by the rotor's geometry. However, it should be remembered, that any electromagnetic device so designed as to prevent a large change in the reluctance of its magnetic circuit, while ensuring a constant air gap during the course of any mechanically sponsored alteration in the mean circuit length, shall experience only minute variations in inductance. The operational benefits of such an arrangement will be that any force produced or work done by the electro-mechanical process, will have a minimal effect upon the magnetic excitation current.

Additionally, the use of high frequency switching technology to develop the required pulses of drive current, will ensure that conversion efficiency, or the transformation from electrical power to mechanical power, will be attainable in the high 90 percentile range.

Application of concepts herein disclosed may be arranged such that the rotor segments may be joined either in series, as depicted in FIG. 1, or in parallel, such that each rotor is equipped with a gear upon its output shaft, and several such assemblies are situated so as to drive a common gear and a main output shaft.

The scaling of these embodiments is straightforward. Accordingly, no great difficulties are anticipated in producing small, medium or very large sized motors of this design.

It should be understood that the embodiment discussed in this application and depicted in the associated drawings are for illustrative purposes only, and that those having skill in the electrical arts will understand that modifications and alterations can be made hereto, within the sprit of the present invention.

What is claimed is:

1. An electric motor, comprising:
    a plurality of motor segments, each segment comprising:
    a stator, having stator poles and stator windings and
    a rotor having a flux path element, said flux path element being attached to a rotor shaft at an oblique angle to the longitudinal axis of said shaft and having a shape that provides a uniform air gap with said stator poles when said shaft is rotated;

wherein said rotor shafts of said motor segments are mechanically coupled to each other.

2. The electric motor of claim 1, wherein said flux path elements comprise a ferrous lamination stack or a solid ferrite plate.

3. The electric motor of claim 1, further comprising a shaft angle sensor and a motor controller, said motor controller receiving a shaft angle from said sensor and supplying current pulses to said stator windings according to said shaft angle.

4. The electric motor of claim 1, wherein said stator poles are positioned in pole pairs with said rotor and rotor shaft between them and forming isolated stator magnetic field circuits when said stator windings are supplied with electrical current, such that a magnetic field is established having a single magnetic polarity in each of said poles of said pole pairs, with said each pole of said pole pairs having opposite magnetic polarity.

5. The electric motor of claim 1, wherein
said rotor flux plate elements have a shape defined by the volume contained between two parallel cuts taken through a right circular cylinder at an angle other than 90 degrees with respect to the axis of symmetry of said cylinder, each flux plate element having a front and back faces that are substantially elliptical, having major axes.

6. The electric motor of claim 5, wherein said angle with respect to the axis of symmetry is substantially 45 degrees.

7. The electric motor of claim 5, wherein said rotors are attached to a common shaft and said rotor flux path elements are arranged on said common shaft such that the major axes of said flux path elements are equally spaced on the shaft and wherein said stator poles are in the same position with respect to the common shaft for each motor segment.

8. The electric motor of claim 7, having two motor segments and two rotor flux path elements, said rotor flux path element being arranged on said common shaft such that their major axes are spaced 90 degrees apart.

9. The electric motor of claim 1, further comprising rotor counterweights.

10. The electric motor of claim 1, further comprising starter windings adapted to start the motor in a desired rotational direction.

11. The motor of claim 1, where in fly-back current is generated in the windings from collapsing fields and said fly-back current is captured and used.

12. The motor of claim 1, having more than two stator poles in each motor segment.

13. An electric motor comprising:
a stator, comprising at least four stator poles, and stator windings;
a rotor having a flux path element attached to a rotor shaft at an oblique angle relative to the longitudinal axis of the shaft, the flux path element shaped to provide a uniform, constant dimension air gap between the flux path element and the stator pole; and
an angular transducer positioned to provide a signal indicative of the rotor shaft position.

14. The motor of claim 13 further comprising:
a controller in communication with the angular transducer and the stator windings and configured to provide drive pulses to the stator windings based, at least in part, upon the signal from the angular transducer.

15. The motor of claim 13 wherein the angular transducer further comprises a rotary encoder.

16. The motor of claim 13 wherein the angular transducer further comprises an optical sensor.

17. A rotor assembly for use in an electric motor comprising:
a flux path element shaped to produce a section of a right circular cylinder canted at an angle with respect to a rotor shaft;
counter weights mounted to the rotor shaft at locations that enable a smooth rotary motion of the rotor shaft; and
a shaft position indicator mounted to the rotor shaft.

18. The rotor assembly of claim 17 wherein the flux path element further comprises a stack of laminations.

19. The rotor assembly of claim 17 wherein the flux path element further comprises a molded ferrite core.

20. An electric motor comprising:
a stator, comprising at least two stator poles, and stator windings;
a rotor having a flux path element attached to a rotor shaft at an oblique angle relative to the longitudinal axis of the shaft, the flux path element shaped to provide a uniform, constant dimension air gap between the flux path element and the stator pole; and
an angular transducer positioned to provide a signal indicative of the rotor shaft position.

* * * * *